Patented Nov. 12, 1940

2,221,689

UNITED STATES PATENT OFFICE 2,221,689

METHOD FOR TENDERING MEAT

Lloyd B. Jensen, Chicago, Ill.

No Drawing. Application December 31, 1938,
Serial No. 248,902

17 Claims. (Cl. 99—107)

This invention relates to a method of treating animal tissue, particularly those tissues such as the flesh and intestines.

One of the objects of this invention is to provide a method whereby animal tissue may be rendered tender without imparting obnoxious odors, tastes, and discolorations to the meat.

Another object of this invention is to provide a method whereby the flesh of edible animal carcasses may be rendered tender.

Another object of this invention is to provide a method of quickly tendering the flesh of edible animal carcasses.

Another object of this invention is to provide a method of quickly curing hams.

Another object of this invention is to provide a method of tendering meat whereby the meat will be rendered tender uniformly throughout its bulk.

Another object of this invention is to provide a method whereby animal intestines may be rendered tender and more adaptable for use as sausage casings.

Another object of this invention is to provide a method whereby such tough casings as hog and Indian sheep casings may be tendered to any desired extent and rendered useful in the manufacture of high grade sausage products which require a tender casing.

Other objects and advantages of this invention will be apparent from the description and claims which follow.

The present invention contemplates the treatment of animal tissue with mold culture products prepared with non-pathogenic molds.

I have discovered that mold culture products prepared with organisms now known to bacteriologists as organisms of the Aspergillus flavus-oryzae group may be employed in practicing my invention.

The members of the Aspergillus flavus-oryzae group are non-pathogenic and elaborate proteases, invertases, maltases, sulphatases, phosphatases, inulases, lactases, lipases, and diastases. These organisms grow at temperatures from about 1 degree C. to 43 degrees C. and elaborate proteases in solutions containing up to 15 per cent salt and also containing small amounts of nitrates, nitrites, sugar, and meat extracts, which materials commonly form the ingredients of meat curing baths. The species Aspergillus flavus is a very common organism. The species Apergillus orzyae is less common in this country, but is quite common in the Orient and is found in spices, frozen eggs, shipping containers, and other materials which are imported from the Orient.

I have isolated Aspergillus oryzae and found that mold culture products prepared with this organism may be used to tender both fresh and cured meats. The organism may be seeded on agar to which is added a small amount of a carbohydrate, for example, 1 per cent sucrose. The mold formed on this medium may be used as a stock culture. Transplants may be made to any medium which will support the growth of the organism.

I have found that the organisms may be grown and will elaborate the desired proteases in the following types of media; sucrose-nitrate broth, bran broth, pickling brine containing 12 per cent salt, nitrate, and corn sugar, pickling brine which has been used in curing meat, and grain mashes such as corn, oat, wheat, rice, or soy bean mash. In preparing mold culture products a suitable medium, for example, a standard sucrose-nitrate broth, or a used pickling brine, is inoculated with a culture of the organisms. The inoculated medium is then incubated at a temperature between 20 degrees C. and 37.5 degrees C. for about seven days or longer, after which the solids are removed from the liquor by filtration or other suitable means. The filtered liquid is then pasteurized to destroy any mold spores. The resultant mold culture products comprising secretions of the organisms and end products of the growth of the organisms may be used in the treatment of animal tissue.

In the treatment of fresh meat the mold culture products or mold culture products diluted with water or other fluid may be injected into the fresh meat. In the treatment of meat which is to be cured, for example, hams, a small amount of the mold culture products may be added to the curing pickle.

As is well known, cuts of beef from certain parts of the animal command a higher price on the market than cuts of other portions of the carcass, chiefly because the higher priced cuts are more tender in that these cuts are found to present the minimum resistance to chewing effort.

The problem of grading beef is largely one of ascertaining by trained observers the probable tenderness of a given carcass or cut of beef.

It is customary in preparing beef of high grade for particularly fastidious consumers to age the beef, that is, to carry the beef under refrigeration for a sufficient length of time to permit the enzymes naturally present in the beef to bring about a noticeable tendering effect. It is necessary, of course, that this aging process be carried on with carefully controlled refrigeration to avoid decomposition. If the aging process is carried on with humidities near 100 per cent, the product becomes moldy to such a degree that appreciable losses are incurred by reason of trimming to remove the mold. If the humidity in the aging refrigerator is kept low enough to prevent mold growth, the surface portions of the carcasses become desiccated, resulting in evaporation loss and the trimming loss necessary to eliminate the desiccated portions.

By the process of the present invention, the desirable results attendant to normal aging are secured without the lapse of time required by normal aging and without the attendant difficulties of mold growth on the one hand or desiccation on the other. By the present invention, tenderness of high quality meats may be improved, and average or mediocre meats may be brought to a degree of tenderness equal to that commonly found in the higher quality beef without imparting to the meat any objectionable odors or flavors.

Cuts of meat, for example, beef steak cuts may be treated by applying the prepared mold culture products or diluted mold culture products to the surfaces of the cut. The treating liquid may be forced into the meat by means of a hollow needle or a plurality of needles, the needles being similar in construction to hypodermic needles.

In commercial practice of the present invention, diluted mold culture products may be diffused through a carcass, or a portion of a carcass, by injecting the liquid into the vascular system of the carcass under sufficient pressure to force the liquid into the extending capillaries and then holding the meat under refrigeration sufficiently low to avoid spoilage until it is prepared for consumption. By utilizing the vascular system for obtaining contact between the mold culture products and the individual tissues of the meat I am enabled to treat any single portion of the carcass without affecting the remaining portions. This is done by dissecting out the end of any main artery or blood vessel leading to a particular portion of the carcass which it is desired to treat, the diluted mold culture products being injected into the selected blood vessel. If it is desired to treat the entire carcass, the injection of the diluted mold culture products can be made into the arteries leading from the heart.

In carrying out my invention, where it is desired to treat the entire carcass, the animal is slaughtered in the usual manner, that is, ordinarily stunned and bled to eliminate the major portion of the blood and serum from the tissues and blood vessels. The animal is then hung up and dressed by removing the skin, head, and entrails. Prior to the removal of the entrails, in the practice of my invention, an incision is made to expose the heart and render the aorta artery accessible. The arteries leading from the heart are connected with a line containing diluted mold culture products under pressure and the liquid is forced throughout the vascular system through the arteries and the capillaries to the meat tissues. An alternative method consists of cutting off the lower end of the heart and injecting the fluid under pressure into the left ventricle.

In the curing of meat, for example hams, the hams are generally placed in a pickling brine containing salt, nitrates, nitrites, and sugar for a desired period of time to effect a penetration of the brine into the meat to impart the desired flavor and to tender the meat. The compositions of the pickling brine and the period of treatment varies with each packer to produce the desired results. The pickling brine may be injected through the vascular system of the ham to secure a more rapid and more uniform penetration of the curing liquor into the bulk of the ham.

I have found that a small amount of the mold culture products may be added to the pickling brine to effect a tendering of the cured meat. The use of a small amount of the mold culture products permits a control of the tenderness of the final end product.

Any method of curing hams may be improved by employing mold culture products in the pickling brine. Quick curing is accomplished by injecting the pickling brine through the vascular system of the ham. The presence of small quantities of the mold culture products in the pickling brine which is pumped into the vascular system of the ham permits a thorough and uniform penetration of the mold culture products into the bulk of the ham and permits the production of hams having uniform tenderness. The present invention, however, is equally effective when applied to the older methods of curing ham, which consist of placing the ham in a pickling brine, or of injecting a small amount of pickling brine at random into the various portions of the ham before placing it in the pickling brine.

I have found that the addition to the pickling brine of 1% of the mold culture products prepared by permitting the organisms to grow in a sucrose-nitrate broth, as explained above, very materially improves the tenderness of hams.

It will be understood, of course, that the time of treatment and the concentration of the mold culture products are variable and may be adjusted at will to secure the desired extent of tendering, which is dependent upon the type of product desired and the initial toughness of the meat.

The treatment of fresh meats or cured meats with liquids containing small amounts of the mold culture products effects a tendering of the meat without developing objectionable odors, colors, flavors, or other organoleptic properties. In preparing the mold culture products, the medium used for the growth of the organisms may be selected so that the resulting mold culture products will impart desired flavors to the meat. For example, the use of used pickling brine or a bran mash results in mold culture products which may be used in quickly curing hams to eliminate the porky flavor characteristic of quick cured hams, and to impart an aged flavor.

Natural casings, as distinguished from artificial or synthetic casings, are prepared from the intestines of edible animals, such as cattle, swine, and sheep. After the set is removed from the carcass, food, manure, and other matter in the intestine is removed by means of conventional stripping rollers. Thereafter, by appropriate means, the gut slimes within the casing are broken down and removed. The product resulting from such treatment is a tubular membrane appropriate for sausage casings.

Sheep casings command a high price because of the fact that they are tender and may be readily eaten with the sausage. High grade frankfurters and fresh pork sausage are conventionally prepared with sheep casings.

Hog casings are suited for the manufacture of frankfurters and other sausages similar in size, but due to the toughness of hog casings, they can not be successfully used in the manufacture of fresh pork sausage and may be used only in the manufacture of the lower grade frankfurters because the casing is objectionable to the consumer, being difficult to masticate. The same is true of Indian sheep casings. Similarly, beef casings are too tough for convenient consumption and are normally removed by the consumer before the sausage is eaten.

In the treatment of sausage casings, a liquid containing the mold culture products may be applied to the casing in any suitable manner as by washing or soaking the casings in the solution, adding mold culture products to the sausage cook water, or spraying, dipping, or wiping the casing with a liquid containing mold culture products after the casing has been stuffed with sausage meat.

It will be understood, of course, that the time of treatment and the concentration of the mold culture products are variable and may be adjusted at will to secure the desired extent of tendering, which is dependent upon the use to which the casing is to be put and the initial toughness of the casing.

I claim:

1. The method of treating animal tissue which comprises subjecting the tissue to the action of mold culture products prepared with organisms of the *Aspergillus flavus-oryzae* group.

2. The method of treating animal itssue which comprises subjecting the tissue to the action of dilute mold culture products prepared with organisms of the *Aspergillus flavus-oryzae* group.

3. The method of treating meat which comprises subjecting the meat to the action of a liquid containing mold culture products prepared with organisms of the *Aspergillus flavus-oryzae* group.

4. The method of treating meat which comprises subjecting the meat to the action of dilute mold culture products prepared with *Aspergillus oryzae*.

5. The method of treating meat which comprises injecting into the meat a liquid containing a small amount of mold culture products prepared with organisms of the *Aspergillus flavus-oryzae* group.

6. The method of treating meat which comprises pumping a liquid containing mold culture products prepared with organisms of the *Aspergillus flavus-oryzae* group through the vascular system of the meat, and thereafter permitting the serum to act on the meat.

7. The method of treating meat which comprises pumping dilute mold culture products prepared with organisms of the *Aspergillus flavus-oryzae* group through the vascular system of the meat and holding the meat under refrigeration.

8. The method of curing hams which comprises treating the hams with a pickling brine containing mold culture products prepared with organisms of the *Aspergillus flavus-oryzae* group.

9. The method of curing hams which comprises treating the hams with a pickling brine containing small amounts of mold culture products prepared with *Aspergillus oryzae*.

10. The method of curing hams which comprises pumping liquid containing mold culture products prepared with organisms of the *Aspergillus flavus-oryzae* group into the ham and thereafter permitting the serum to act on the ham.

11. The method of curing ham which comprises pumping a pickling brine containing mold culture products prepared with organisms of the *Aspergillus flavus-oryzae* group into the vascular system of the ham and thereafter permitting the serum to act on the ham.

12. The method of curing ham which comprises pumping a liquid containing mold culture products prepared with *Aspergillus oryzae* into the vascular system of the ham and permitting the secretions to tender the ham.

13. The process of tendering natural casings which comprises treating the casings with mold culture products prepared with organisms of the *Aspergillus flavus-oryzae* group.

14. The process of tendering natural casings which comprises treating the casings with mold culture products prepared with *Aspergillus oryzae*.

15. The process of tendering natural casings which comprises spraying dilute mold culture products prepared with organisms of the *Aspergillus flavus-oryzae* upon the casings.

16. The process of tendering sausages encased in natural casings which comprises treating the casing upon the sausage with mold culture products prepared with organisms of the *Aspergillus flavous-oryzae* group.

17. The process of tendering sausages encased in natural casings which comprises treating the casing upon the sausage with dilute mold culture products prepared with *Aspergillus oryzae*.

LLOYD B. JENSEN.